United States Patent [19]

Stankiewicz et al.

[11] 3,913,138

[45] Oct. 14, 1975

[54] FLYING MAGNETIC STRIP HEAD

[75] Inventors: Raymond J. Stankiewicz, Philadelphia; Edwin R. Phillips, Rosemont, both of Pa.

[73] Assignee: Sperry Rand Corporation, Blue Bell, Pa.

[22] Filed: Dec. 26, 1973

[21] Appl. No.: 427,764

[52] U.S. Cl. .............................................. 360/103
[51] Int. Cl. .............................................. G11b 5/60
[58] Field of Search ............ 360/102, 103, 105, 109

[56] References Cited

UNITED STATES PATENTS

| | | | |
|---|---|---|---|
| 2,905,768 | 9/1959 | Cronquist | 360/103 |
| 2,905,768 | 9/1959 | Cronquist | 360/103 |
| 3,031,532 | 4/1962 | Lynott | 360/103 |
| 3,124,660 | 3/1964 | Criner | 360/103 |
| 3,193,811 | 7/1965 | Clarke et al. | 360/103 |
| 3,193,835 | 7/1965 | Wadey | 360/103 |
| 3,327,916 | 6/1967 | Weidenhammer | 360/103 |
| 3,618,056 | 11/1971 | Hurlimann | 360/103 |
| 3,631,425 | 12/1971 | Tang | 360/103 |

*Primary Examiner*—Vincent P. Canney
*Attorney, Agent, or Firm*—Rene A. Kuypers

[57] ABSTRACT

The invention relates to a cantilevered flexible strip which supports a pivotless flying magnetic head for use with a rotating mass memory. A vacuum is utilized to load the head into close proximity with the memory so that a permanent dynamic air wedge is formed between the strip and the memory surface. A strip head assembly is thereby produced having a design characteristic of a low mass, high hydro-pneumatic spring constant and vacuum loading system to minimize or eliminate head to surface crashes.

9 Claims, 5 Drawing Figures

FLYING MAGNETIC STRIP HEAD

FIELD OF THE INVENTION

The invention relates to the field of magnetic reading and recording and in particular to the field of flying magnetic heads utilized in such operations.

DESCRIPTION OF THE PRIOR ART

A recognized shortcoming of the known prior art flying head disc arrangements has been the high force loading required in the access arm to produce flying heights of less than 100 microinches with respect to a rotating disc. In the known prior art the force loading is as high and this high force load characteristic is achieved with high mechanical spring loading. However, in order to produce the required high mechanical spring loading a corresponding high mass system is produced which in turn produces problems in terms of dynamic response to disc vibration. Therefore, the higher the mass of the system, the poorer will be head response to various surface irregularities so that the head does not follow the surface contour and may in fact crash against the disc. This action of course may damage the head and/or the disc. In other words, the prior art high mass head arrangements provide a high kinetic energy system which may cause excessive damage in the event of a crash.

There are other recognized shortcomings in the known present day rotating mass memory disc memories utilizing flying head assemblies. The main shortcoming resides in the use of pivot points whereat the magnetic head structure is connected to the access arm, which moves across the disc surface. The pivot point is the position of the applied load and its location together with the center of hydrodynamic pressure determines the angle of attack of the head with respect to the rotating disc. The coincidence of the center of pressure and the hydrodynamic pressure point is often times difficult to achieve in practice so that stable operating performance of a flying head with respect to a rotating memory is not guaranteed.

Another problem with present day flying heads which are flying at heights of 50 microinches or less, is their characteristic of periodically crashing into the disc upon landing or getting into position for a read/write cycle. When a head crashes into the disc surface the head oftentimes wobbles about its pivot points thereby making it difficult to regain its equilibrium. The entire operation must accordingly be shut down and valuable computer time is thereby lost.

An additional salient shortcoming of the generally used and known access arm has been its relatively high cost and complexity. Also to prevent the loss of the air wedge, the prior art has resorted to using a crowned head. Therefore, the access arm and crowned head have resulted in an arrangement which is difficult to manufacture.

The presently known head-disc arrangement is not entirely satisfactory since a zone area is required on the disc for landing the head on the disc prior to initiating a read/write cycle. The landing zone utilizes space on the disc on which no recording can take place and hence is wasteful of valuable memory locations. The prior art requires a landing zone because the high mass head systems frequently hit the memory surface in the landing zone thereby damaging the recording surface and making data storage in this area unreliable.

The following known prior art patents and the references cited therein are made of record: U.S. Pat. Nos. 2,905,768; 2,928,709; 3,170,045; 3,177,495; 3,180,943; 3,202,772; 3,612,775; 3,697,965.

SUMMARY OF THE INVENTION

Accordingly, it is with the above shortcomings in mind that the instant invention has been developed. In particular, the present invention solves the problem of obtaining high loading of the access arm but nevertheless achieves this result with a low mass low energy configuration. In addition, the head of this invention is able to achieve low flying heights and minimize the possibility of contact thereby making feasible metal plated (i.e. nickel-iron) discs which would allow increased data storage and improved performance over that of the well-known iron oxide discs.

Another feature of the present invention over the prior art is the elimination of the pivot loading point and gimbal support structure. The gimbal as is well known is a connecting structure for attaching the head to the loading arm.

An additional feature of the instant invention is that the nature of the interface between the strip and the disc automatically forms a wedge of air to provide a dynamic bearing. The nature of the strip head is such that the air wedge cannot be destroyed as in prior art devices so that there is minimal likelihood that there may be a head crash. The low kinetic energy of the assembly is also significant in minimizing damage in the event that there is a head crash.

Another feature of the present invention resides in obtaining additional tracks of recorded information on a rotating disc member. This is of importance in view of the present day requirement that more data be recorded on the recording medium. The total additional tracks of information obtained by utilizing the instant invention is significant when considered in terms of a disc pack arrangement.

DESCRIPTION OF THE PREFERRED EMBODIMENTS

Figure 1:
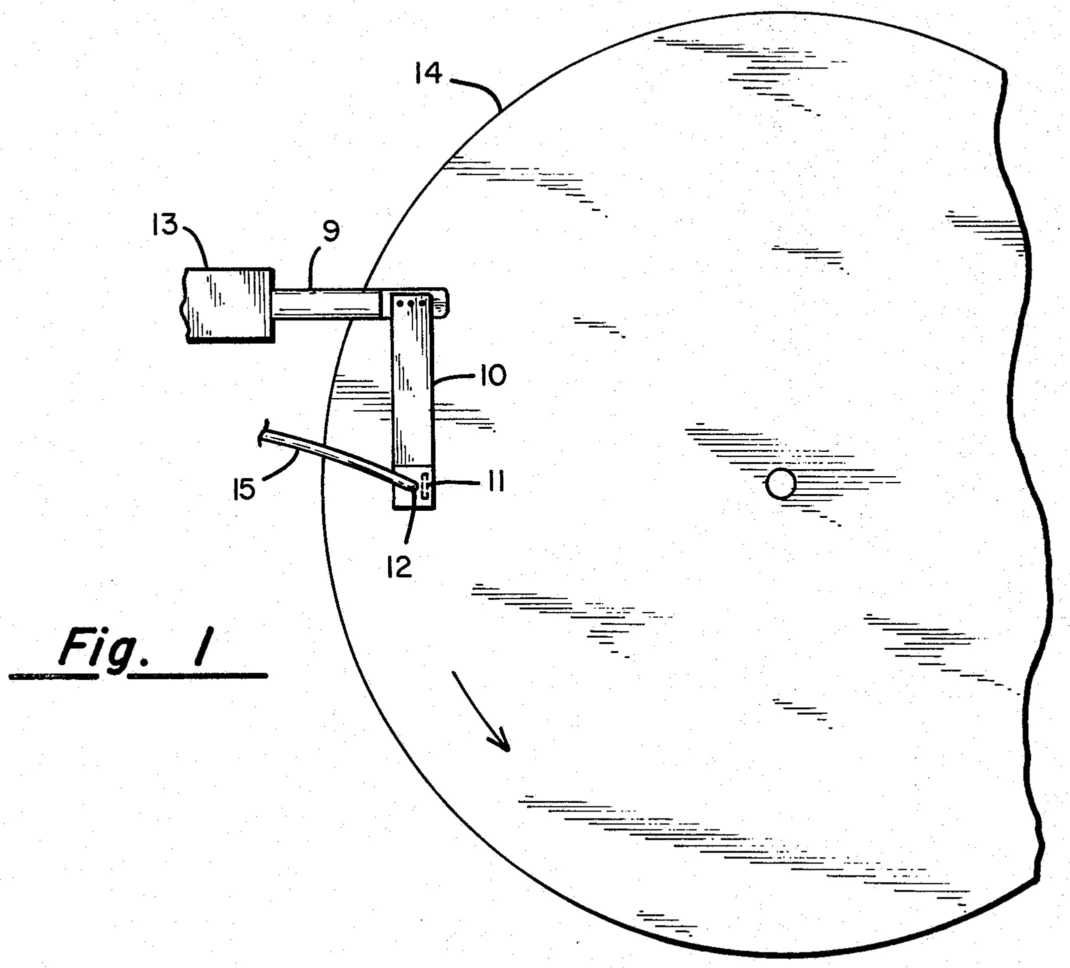
FIG. 1 depicts the cantilever thin strip flying head assembly utilized in this invention.

Referring now to FIG. 1 there is depicted an overall view of the cantilever flying magnetic strip head 10 of this invention with respect to the rotating disc 14. The disc 14 rotates counterclockwise very rapidly with respect to the head 10 as shown so that a hydrodynamic air bearing is formed between the disc surface and the head. The air bearing formed by the rotating disc exerts a dynamic upward force against the head 10 as will be discussed further hereinafter.

The strip head 10, which is cantilevered from the radial arm 9 by means of conventional attaching means is thin and on the order of 3–8 mils thick non-magnetic, moderate strength metal or ceramic. The radial arm 9 is connected to a head positioning device 13 for purposes of locating and mechanically loading the strip head on a desired data track of the disc 14.

Located near the end of the strip 10 is the vacuum porting hole 12. The magnetic read/write carcass 11 is located along the side of the porting hole 12. The carcass 11 includes the iron-ring core (not shown) for reading and recording information on the disc 14, which conventionally utilizes an iron-oxide surface. The disc 14 may also utilize a magnetically plating surface such as nickel-iron. This also will be discussed in more detail hereinafter.

The port 12 is connected to vacuum chamber 23 as can be appreciated by referring to FIG. 2 and to the vacuum line 15. As is understood, the vacuum line 15 is connected to a vacuum source (not shown) so that ambient air may be withdrawn from beneath the head assembly. A source of positive air may also be connected to the line 15 in a manner whereby either positive or negative pressure may be generated in the chamber 23. The selection of positive or negative pressure for the chamber 23 may be obtained by simple 3-way valve switching means 50.

Figure 2A:
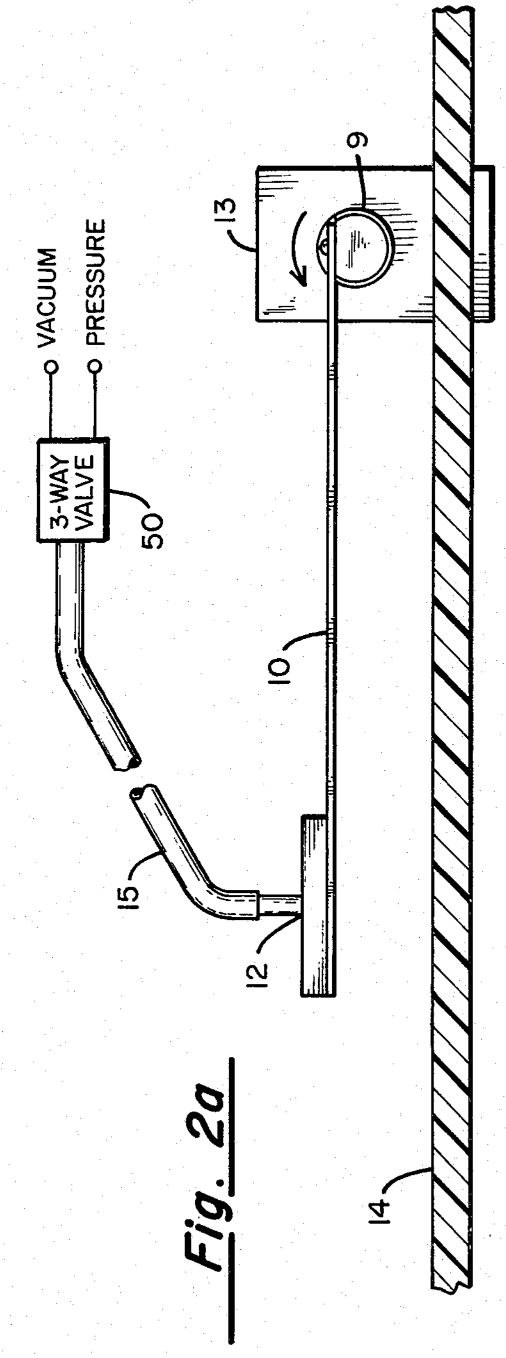
FIG. 2 consisting of FIGS. 2*a* and 2*b* illustrates respectively the loaded and unloaded positions of the strip head with respect to a memory disc assembly.

Referring now to FIG. 2*a*, in particular, there is shown the flying strip head 10 in the unloaded position. In the unloaded position, the vacuum line 15 is disconnected from the vacuum source by the valve switching means and consequently head 11 (FIG. 1) is located at a remote distance from the disc 14. In other words, the head may be placed in the unloaded position by either removing the vacuum and allowing the strip to seek its natural position, or by applying a positive pressure to the line. In any event, in the unloaded position the strip head assembly 10 is far enough removed so that the disc 14, which may be only one of a plurality of such discs forming a disc pack, can be readily removed.

Figure 2B:
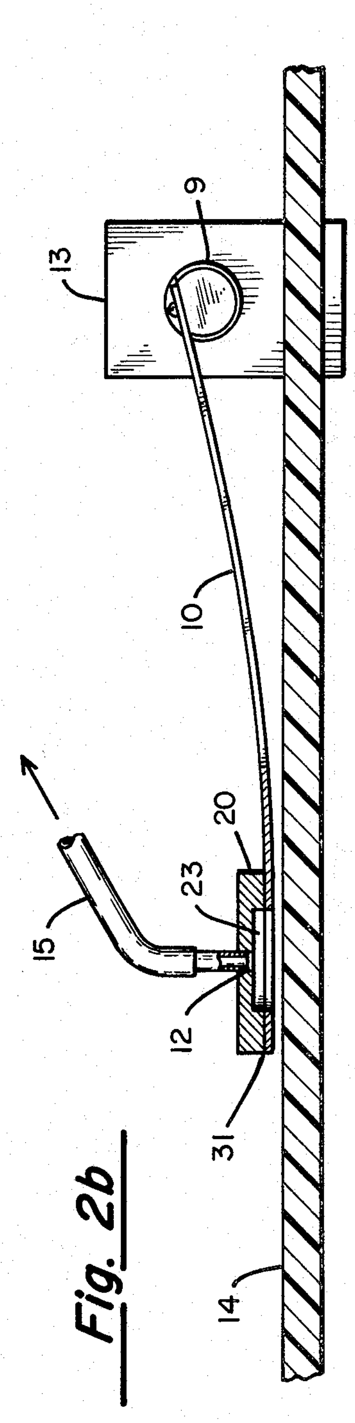

Referring now to FIG. 2*b*, there is depicted the flying strip head 10 in the mechanically loaded position. The strip assembly is mechanically loaded by rotating the arm 9 so that the carcass 11 (FIG. 1) is oriented over the required memory track. In this state, the strip head is flying on but without contacting the boundry layer of air associated with the rotating disc.

After positioning the strip head onto the disc boundry layer, the vacuum is introduced through the line 15. A vacuum is therefore formed through chamber 23 and a force is produced as a result of the applied vacuum which is proportional to the area of the vacuum chamber times the pressure (see FIG. 3). This force loads the strip head assembly 10 into the disc 14 against the upward pressure force created by the flying characteristics of the disc-strip arrangement. When a force balance is achieved between the vacuum and hydro dynamic bearing forces, the strip flies at a stable height. By controlling the vacuum pressure, the strip assembly can be flown at any desired flying height above the disc and in the present preferred embodiment is approximately 10 to 20 microinches for a disc rotation of 3,600 RPM.

Figure 3:
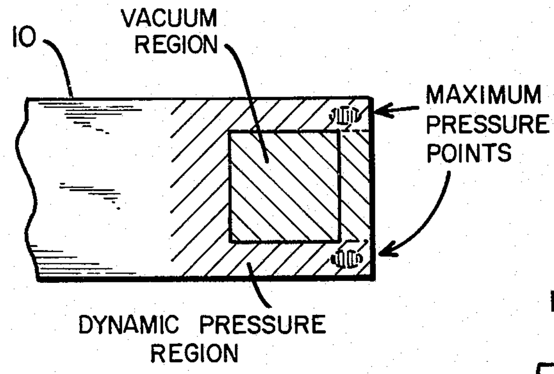
FIG. 3 shows the distribution of dynamic pressure and vacuum at the head-disc interface.

The vacuum chamber 23 of FIG. 3 is shown to be square such that two maximum hydrodynamic pressure points occur at the corners of the trailing edge 31. It is deemed that this arrangement provides an optimum design to obtain low flying heights, minimum mass and minimum vacuum loading because the pressure points occur over a small and localized area. In other words, the hydrodynamic force acting through the small areas is less thereby reducing the vacuum loading requirement.

The present invention is suitable for obtaining maximum performance at some minimum flying height, for example 8 microinches, where occasional hits might occur while performing a read/write cycle and then the head is withdrawn by means of the 3-way valve 50. Accordingly, the present system can be readily adapted to an On-Off arrangement such that there is head to surface proximity ony when there is a need.

Also instant strip head invention by its arrangement of combining positive pressure produced by the hydrodynamic air bearing and negative pressure by vacuum means produces a desired stability in view of its elimination of the prior art pivot loading points. The positioning of the pivot loading points has been found troublesome in modern day computer technology since its location determines the angle of attack of the head's leading edge. In turn, the head's angle of attack is instrumental in producing a pneumatic wedge, which provides an upward lifting force against the head. In the event that this type of head encounters surface run-out (i.e., a location which is not flat), there is likelihood that the disturbance can produce an oscillation about the pivot thereby destroying the hydrodynamic wedge causing the head to crash. The likelihood of the above occurring is likely to happen particularly in the light of modern day minute spacing between the disc and the head.

In the instant invention, the cantilevered pivotless strip 10 not only locates the magnetic head carcass 11 but in addition produces a pneumatic wedge which can never be destroyed. This results from the fact that when the strip head 10 is loaded into proximity with the disc 14, the assembly forms a natural wedge configuration with the disc surface. In other words, because of the relationship of the strip to the disc, a wedge of air will always exist and separation between the disc and strip is achieved. Therefore, the hydro-dynamic bearing beneath the wedge as previously mentioned produces an upward force such that when disc run-out is encountered, the air bearing follows the run-out and produces a force which causes the head to avoid impinging upon the disc surface. Therefore, since the head carcass 11 is pivotless it will also rise with the strip 10 to avoid surface run-out. Consequently, the air wedge is not destroyed and the head crashing is prevented or minimized.

The strip head assembly 10 is also characterized by low mass and a high spring rate system. Thus in the preferred embodiment, the mass of the strip head is approximately 0.7 grams. The low mass system of this invention is achieved because of vacuum loading. In contrast, the most popular of the prior art arrangements has a mass of 6 grams. Furthermore, the dynamic air wedge 25 produced by the strip 10 is analogous to a high rate spring. This high spring rate and low mass work together to prevent head to disc contact. This concept provides a significant advance over known prior art systems.

Figure 4:
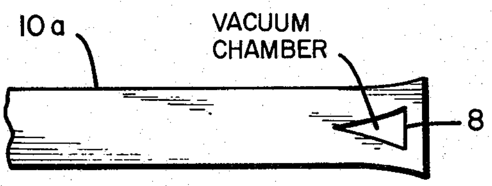
FIG. 4 illustrates another configuration of the vacuum chamber.

The picture frame vacuum chamber 23 of FIG. 3 may be modified for purposes of adjusting the angle of attack. Such a modification is shown in FIG. 4 as being triangular. Other modification may be made to this structure without departing from the spirit of the invention.

The instant invention is particularly useful in modern day memory technology since it allows extremely close spacing of the magnetic head to the memory surface. This is significant since in order to pack more bits per inch of recording surface, the head to recording interface must be reduced. This is particularly true with respect to a Ni-Fe plated memory surface. Thus, it is well recognized that a Ni-Fe plated disc can store more information per inch than the well known iron-oxide surface. However, Ni-Fe plated disc up until the present time have not been practicable in view of the above-stated difficulty in achieving low flying heights without incurring possible scratching due to head crashing.

The instant strip head assembly is suitable not only in view of the close head to surface spacing but also because a low kinetic energy system is provided. Therefore, when an accidental touching of the head to rotating memory surface occurs utilizing the present invention, the damage that may occur is minimal since the crash is of a low energy nature vis-a-vis a known prior art flying head.

Another advantage of the present invention resides in an additional 250 recording tracks of information which are obtained on a disc over that of the prior art. This results from the fact that a landing zone where no data storage is allowed is no longer required to load the head assembly onto the disc. However, a landing zone may be designated in the instant invention in view of the nearby crash free characteristics of the strip head 10 so that data storage in the landing zone is practical.

The landing zone of a disc occupies approximately five-eighths of an inch or 250 track of information. This increase amounts to a 23% increase in recording space and accordingly represents a significant increase.

Other significant advantages accrue over the prior art devices. Thus, in view of the simplicity of the invention, reduced manufacturing cost results. This is particularly true in view of the elimination of the head pivot points and gimbal device as well as the necessity for bringing the head into dynamic balance. Other advantages will be readily apparent to those skilled in the art.

We claim:

1. In a low mass flying head arrangement for use with a rotating memory device comprising:

a. a cantilevered strip of flexible material;

b. a pivotless magnetic head located integral with said strip for recording, or in the alternative, reading information from said memory device;

c. vacuum means located along the end of said strip for forming a vacuum to load said head into proximity with the surface of said memory and for forming a dynamic air bearing under said strip, whereby head crash damage into said memory surface is prevented or minimized.

2. The low mass flying head in accordance with claim 1 wherein said vacuum means includes a chamber which provides maximum pressure points located approximately intermediate the respective corners of the trailing edge and a directly opposite corner of the vacuum chamber of said flying strip head.

3. The low mass flying head in accordance with claim 1 wherein said vacuum means includes a square vacuum chamber located along the trailing edge of said flying strip head.

4. The low mass flying head in accordance with claim 2 wherein switching means are connected to said vacuum means for switching a vacuum source alternatively on and off to said chamber.

5. The low mass flying head in accordance with claim 4 wherein a positive air source is additionally connected to said switching means, whereby said positive air source is utilized to withdraw said flying head from a position near said memory surface.

6. The method of flying a low mass, thin flexible strip magnetic head over a high speed rotating memory surface comprising the steps of, a. forming said thin, flexible strip head into a cantilever;

b. loading said head into close proximity to said memory surface by means of a vacuum formed along the trailing edge of said strip, said thin strip being flexed by said vacuum to form a hydrodynamic bearing between said strip and said memory surface, c. whereby head crash damage into said rotating memory surface is minimized or eliminated.

7. The method of flying a low mass magnetic strip head in accordance with claim 6 and including the step of a. unloading said magnetic head from said rotating memory surface by means of a positive pressure source.

8. The method of flying a low mass magnetic strip head in accordance with claim 6 and including the step of, a. forming a square, picture-frame shaped vacuum chamber in said strip head along said trailing edge.

9. The method of flying a low mass, thin, flexible magnetic head over a rotating memory, which forms a boundry layer of air comprising, a. forming said thin strip into a cantilever;

b. positioning said head upon the upper surface of said boundry layer;

c. loading said head into close proximity of said memory and near the lower surface of said boundry layer by means of a vacuum formed along the trailing edge of said strip, said thin strip being flexed by said vacuum to form a hydrodynamic bearing between said strip and said memory surface, d. whereby head crash damage into said rotating memory surface is minimized or eliminated.

* * * * *